J. A. KELLER.
MOTOR SNOW PLOW.
APPLICATION FILED FEB. 21, 1916.
1,189,123.
Patented June 27, 1916.
3 SHEETS—SHEET 1.
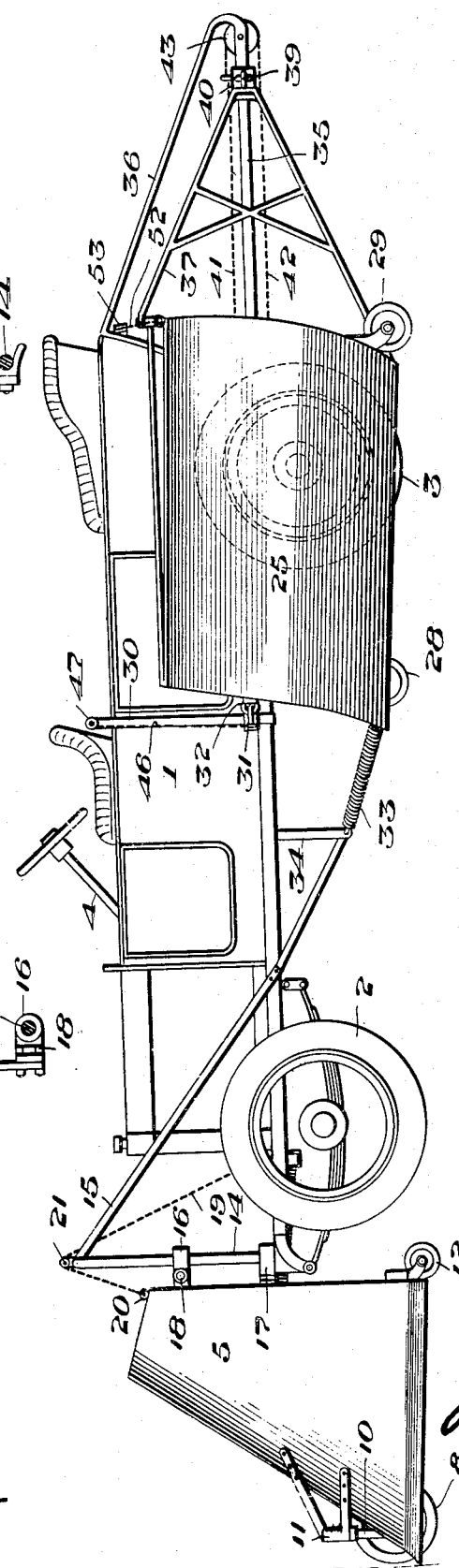

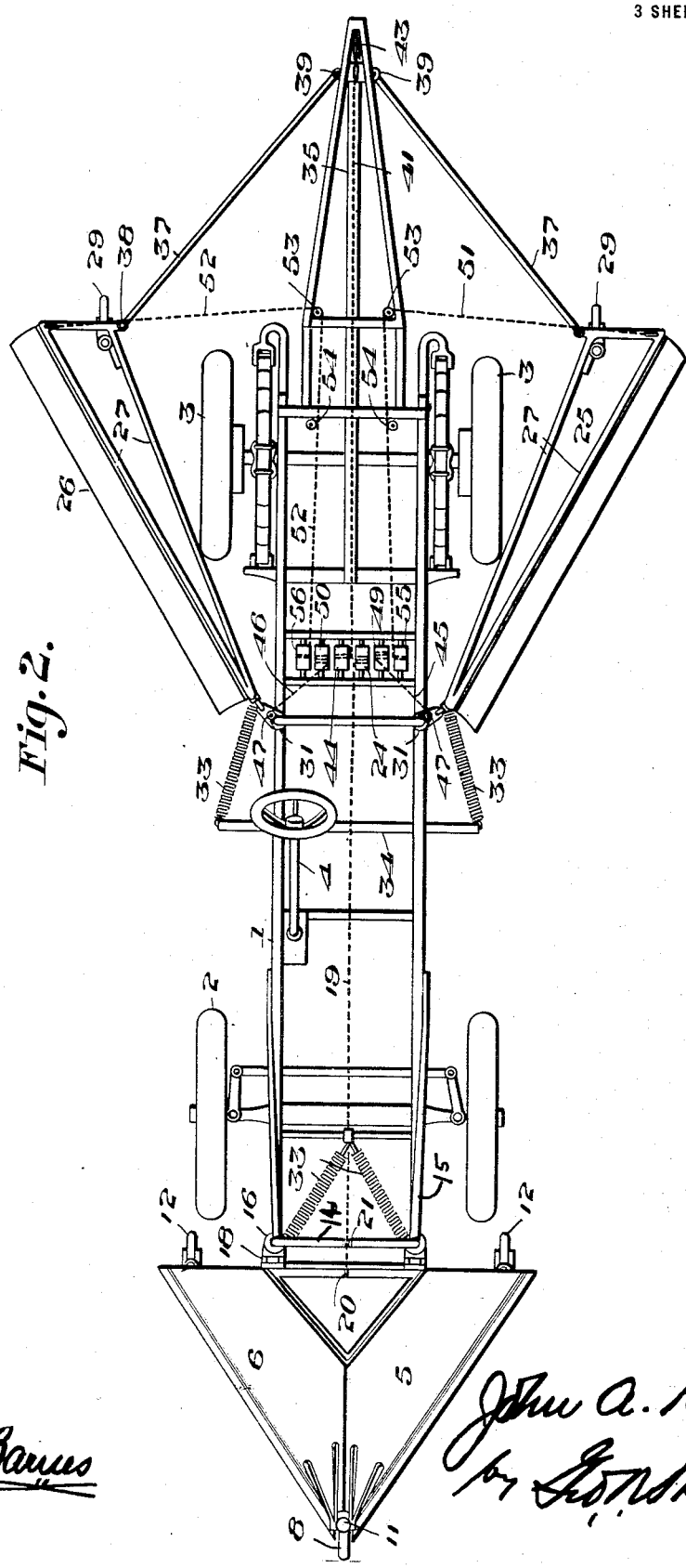

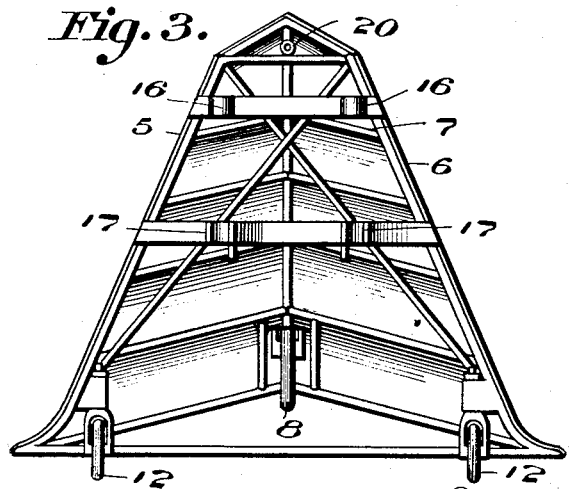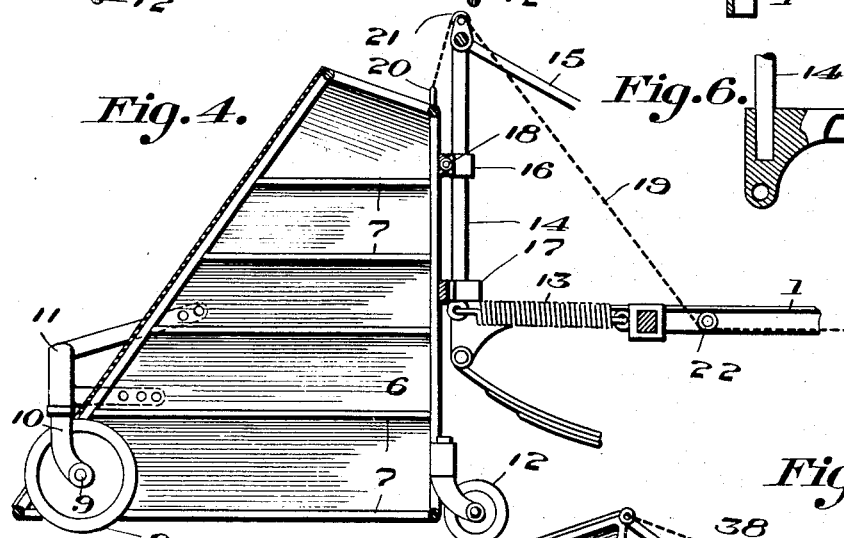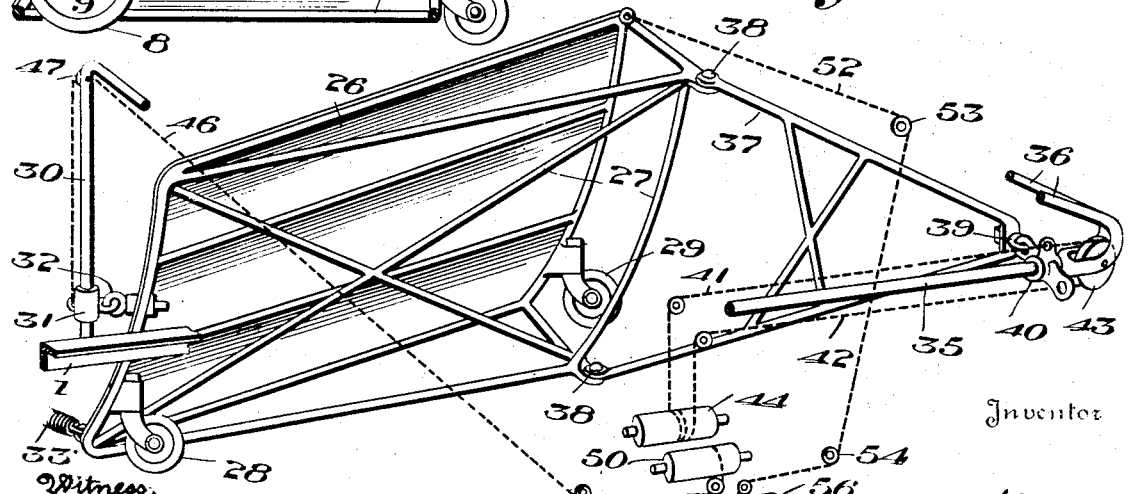

UNITED STATES PATENT OFFICE.

JOHN A. KELLER, OF NEW PALTZ, NEW YORK.

MOTOR SNOW-PLOW.

1,189,123.  Specification of Letters Patent.  Patented June 27, 1916.

Application filed February 21, 1916.  Serial No. 79,578.

*To all whom it may concern:*

Be it known that I, JOHN A. KELLER, a citizen of the United States, residing at New Paltz, county of Ulster, and State of New York, have invented certain new and useful Improvements in Motor Snow-Plows, of which the following is a specification.

This invention relates to motor snow plows.

My object is to provide a snow plow embodying novel features and improved combinations of parts with improved means for adjustment to meet the varying conditions of use and adapted for application to any motor vehicle chassis and operable for the cleaning of city or village streets and highways.

The snow plow of the present invention embodies, first, a front dirigible plow connected to the motor vehicle or truck in a novel manner and adjustable up and down, laterally and in a tilting manner in relation thereto; second, rear plows combined with improved means for relatively expanding or contracting them to clear a wider or a narrower swath and for independently elevating and tilting them according to conditions met with in use; third, a motor snow plow having front and rear plows and means located at a generally common point, whereby necessary or desirable adjustments of any one of the plows may be obtained, or simultaneous adjustment of the rear plows had; fourth, those improved features and novel combinations and coöperative devices set forth more fully hereinafter and disclosed in the accompanying drawings, and defined in the claims.

As my invention is susceptible of various modifications without changing its essential principles and mode of operation, the disclosure of the invention in the following description and accompanying drawings is to be considered as illustrative, rather than restrictive, of the scope of the invention.

In the accompanying drawings: Figure 1 is a side elevation; Fig. 2, a plan view; Fig. 3, a view looking toward the interior of the front plow, which is detached; Fig. 4, a vertical section through the plow, certain parts being in full lines; Fig. 5, a detail elevation, with certain parts in section, showing the front guide frame; Fig. 6, a detail connection between the front guide frame and the chassis; Fig. 7, a detail perspective. with parts broken away, showing one of the rear plows and, in a diagrammatic manner, the operating means therefor; Fig. 8, a horizontal section through the front guide frame, showing how the front plow is supported by the collars; Fig. 9, a similar view showing the guide forks; and Fig. 10, a detail of one of the guiding and elevating devices for one of the rear plows, with parts of the chassis and guide frame.

The chassis 1, front and rear wheels 2 and 3 and steering means 4 may be of any desired construction.

The front plow is composed of forwardly converging sides 5 and 6 which are cross-braced, as shown at 7 in Fig. 3. At the front or point of the plow is a caster wheel 8 whose axis 9 is offset from its vertical stem 10 which is journaled in the bracket 11 in such manner that its wheel will respond, by its idle trailing, to any turn in the steering wheels 2 so that the front plow will at once turn to the right or left as the motor vehicle is turned. Smaller caster wheels 12 support the rear parts of the plow at the sides thereof and they, like the wheel 8, freely trail to enable the front plow to automatically turn with the turning of the motor vehicle. To hold the front plow normally directly ahead, there are provided the coil springs 13. An inverted U-shaped guide frame 14 which is secured by braces 15, has upright portions which serve as guides for the rings or collars 16 on the upper part of the rear of the front plow. Lower down, there are forked guides 17 secured to the rear of the plow and likewise bearing upon the upright parts of the guide frame 14. The coil springs 13 draw the lower part of the front plow rearwardly to cause the forks 17 to constantly bear on the guide frame 14 and yet to permit up and down sliding movement for purposes of adjustment of the front plow. The guide collars 16 are hinged at 18 so that the lower portion of the plow may tilt upwardly, the forks 17 permitting such tilting, whenever necessary, but the springs 13 are so arranged and of such strength that the plow will be drawn back as soon as the occasion for elevating the plow has passed. To raise and lower the front plow, the guides 16 and 17 slide on the frame 14, and a cable 19 is connected to the eye 20 at the central top portion of the rear part of the plow, this cable passing over suitable pulleys or sheaves 21, 22 and 23 to any suitable windlass or winding device 24.

The rear plows 25 and 26 are provided with suitable skeleton bracings 27 on their inner sides and at their forward and rear lower parts they have idle or caster wheels 28 and 29 which are free to swing like the wheels 8 and 12, and consequently, these wheels 28 and 29 automatically trail according to the direction in which the machine is advancing or turning. An inverted U-shaped guide frame 30 rising from the chassis 1 serves as a guide for the collars 31 which slip up and down thereon and to which the front portions of the plows 25 and 26 are connected by eye-bolts 32, as shown in Figs. 7 and 10. Stout coil springs 33 connect the lower corners of the plows 25 and 26 to brackets 34 on the chassis and the direction of pull of these springs is such that they hold the lower forward corners of the plows 25 and 26 in proper position. The slides 31 and eye-bolts 32 provide means whereby the plows 25 and 26 may be raised or lowered to any desired position, and whatever position they may assume they are adapted to be swung inwardly and outwardly in relation to the chassis 1 and further, the rear ends of the plows 25 and 26 may, by reason of this joint, be raised or lowered so that the general forward extent of each plow may be arranged at any desired inclination to the horizontal. Extending longitudinally of the chassis 1 is a guide bar 35 which is rigidly fastened by the braces 36. Supplemental frames 37, suitably braced, are hinged at 38 to the upper and lower portions of the respective frames 27 and the rear ends of the respective frames 37 have swiveled or eye-bolt joints 39 and a guide or runner 40 which slides on the guide 35. The frames 37 assist in supporting the plows 25 and 26 and also constitute, with the runner 40, means whereby the two frames 27 and the respective plows 25 and 26 carried thereby, may be simultaneously swung inwardly or outwardly to vary the width of the swath cleared by the plows 25 and 26. This adjustment is accomplished by a double cable whose upper and lower stretches 41 and 42 run over a sheave 43, and one of these stretches connects to the runner 40. The cable winds on any suitable windlass 44 located in the same general region as the windlass 24. When the windlass is operated in one direction, the plows 25 and 26 are spread and when operated in the opposite direction, they are drawn toward each other. For the purpose of raising and lowering the collars 31, there are provided independent cables 45 and 46 which run over sheaves 47 and 48 on the guide frame 30 and are adapted to wind on the respective windlasses 49 and 50 located in the same general region as the windlasses 24 and 44. To raise and lower the rear ends of the plows 25 and 26, I provide cables 51 and 52 connected to the plows 25 and 26, which, after running over pulleys 53 and 54, extend to the respective windlasses 55 and 56 located in the same general region with the windlasses aforesaid. Any suitable winding and locking means may be provided for the windlasses. The form of windlass is not important and other winding means may be provided. While not essential, the braces and frame-work are preferably of angle iron for purposes of lightness and strength and the guide frames 14 and 30 are of tubing.

The front plow may be raised and lowered and held at any desired height and it automatically turns and responds to the direction of movement of the motor vehicle. Each of the rear plows can be independently raised and located at any desired height and tilted to any desired inclination. Both of the rear plows can be simultaneously moved inwardly or outwardly to cut a narrower or wider swath. However the plows may be disposed, the springs 33 hold the wheels 28 and 29 down to run along the surface operated on so that the plows are held to their work. Inward pressure on the plows is resisted by the supplemental frames 37 and the means employed to adjust them.

Having thus described my invention, what I claim as new and desire to secure by Letters Patent, is:

1. In a snow plow, the combination with a vehicle, of a front plow, guides on the vehicle, hinged guide connections thereto from the upper portion of the plow, said plow having loose connections to said guides at points lower down whereby said plow is free to automatically tilt at all times and when at any height and may be raised and lowered independently of said tilting, and means for bodily raising and lowering said plow independently of its adaptability to automatically tilt.

2. In a snow plow, the combination with a vehicle, of a front plow, and guiding and adjusting means adapted to permit up and down movement of the snow plow and tilting movement thereof comprising upright guides on the vehicle, hinge collars on the plow which are slidable on the guides, and forks on the plow which are slidable on the guides.

3. In a snow plow, the combination with a vehicle, of a front plow, guides on the vehicle, hinged guide connections thereto from the upper portion of the plow, said plow having loose connections to said guides at points lower down whereby said plow is free to automatically tilt at all times and when at any height and may be raised and lowered independently of said tilting, means for bodily raising and lowering said plow independently of its adaptability to automatically tilt, and spring means adapted to hold the plow in normal position and to retract it after it has tilted when the plow is at any height.

4. In a snow plow, the combination with a vehicle, of upright guides thereon, a front plow, hinged collars carried by the front plow and slidable up and down on the guides, and forks carried by the front plow and slidable up and down on said guides.

5. In a snow plow, the combination with a vehicle, of upright guides thereon, a front plow, hinged collars carried by the front plow and slidable up and down on the guides, forks carried by the front plow and slidable up and down on said guides, and retracting springs connecting the front plow to the vehicle adapted to normally hold the forks on the guides and to retract the front plow after it has tilted.

6. In a snow plow, the combination with a vehicle, of a front plow comprising converging plow parts, caster wheels at the rear and at the point of said plow, said front plow having a vertically adjustable and a freely tilting connection with the vehicle, means for bodily raising and lowering the front plow and for holding it where adjusted, and means for automatically retracting the front plow after it has tilted.

7. In a snow plow, the combination with a vehicle, of a plow adapted to be raised and lowered, to be tilted, and to be swung inwardly or outwardly, independent means for effecting the respective movements of the plow as aforesaid, and spring means for holding the plow in position for effective work.

8. In a snow plow, the combination with a vehicle, of swinging plows on opposite sides thereof, slidably pivoted at their forward ends to said vehicle, a guide, a runner, frames pivotally connected to the runner and to the respective plows, said frames being hinged to the plows and swiveled to the runner, whereby the respective plows may be independently adjusted up or down at their front and rear ends, in addition to being simultaneously adjusted toward and away from each other, and means for adjusting the respective plows up or down at their forward and rear ends.

9. In a snow plow, the combination with a vehicle, of a plow pivoted at its forward end to the vehicle for up and down tilting, up and down sliding movement, and in and out swinging in relation to the vehicle, and means for effecting the aforesaid adjustments.

10. In a snow plow, the combination with a vehicle, of a plow mounted for up and down tilting, up and down sliding movement, and in and out swinging in relation to the vehicle, means for effecting the aforesaid adjustments comprising a guide, a collar, and a swiveled connection between the collar and the front portion of the plow, raising and lowering means for said front portion of the plow, raising and lowering means for the rear portion of the plow, a frame hinged to the rear portion of the plow, a runner to which the frame is articulated, and means for moving the runner.

In testimony whereof, I hereunto affix my signature.

JOHN A KELLER.